United States Patent [19]
Matthews, Jr. et al.

[11] 3,822,559
[45] July 9, 1974

[54] CONTROLLED YIELD STINGER
[75] Inventors: Jamie F. Matthews, Jr., Houston, Tex.; Martin O. Pattison, Palos Verdes Estates, Calif.
[73] Assignee: Esso Production Research Company, Houston, Tex.
[22] Filed: Jan. 29, 1973
[21] Appl. No.: 327,272

[52] U.S. Cl............... 61/72.3, 72/161, 226/106, 226/111
[51] Int. Cl........................ F16l 1/00, B21b 23/00
[58] Field of Search.............. 61/72.1, 72.3; 72/161; 226/106, 105, 111, 112

[56] References Cited
UNITED STATES PATENTS
3,331,212  7/1967  Cox et al............................ 61/72.3
3,473,340  10/1969  Ferrentino........................ 61/72.1
3,641,778  2/1972  Gibson............................... 61/72.3
3,685,306  8/1972  Mott.................................. 61/72.3

Primary Examiner—Jacob Shapiro
Attorney, Agent, or Firm—James E. Reed

[57] ABSTRACT

A marine pipeline is laid by lowering the line into place over a retractable curved stinger which is mounted on the vessel and extends over its stern. The curved stinger is provided with rollers or similar members which are mounted at spaced intervals along an arc having a radius of curvature sufficiently small to exceed the elastic limit of the pipe as the pipeline moves over the rollers and with straightening means near the outer end of the apparatus. By extending or retracting the curved stinger, the angle of departure of the pipe as it leaves the vessel and enters the water can be varied.

15 Claims, 3 Drawing Figures

PATENTED JUL 9 1974 3,822,559

CONTROLLED YIELD STINGER

BACKGROUND OF THE INVENTION

1. Field of the Invention

This invention relates to the laying of underwater pipelines from floating vessels and is particularly concerned with deep water pipelaying operations in which transverse waves and currents are apt to be encountered.

2. Description of the Prior Art

Marine pipelines are generally installed by lowering them into place on the sea floor from the stern of a moving laybarge or similar vessel. As the pipe leaves the vessel, it bends under its own weight and thus assumes a generally S-shaped configuration between the stern of the vessel and the sea floor. The amount of bending which occurs depends upon the weight and dimensions of the pipe, the depth of the water, the amount of tension maintained in the line, and other factors. Excessive bending will result in kinking or permanent deformation of the pipe and hence a pipe discharge ramp or stinger which extends into the water behind the barge and supports the pipe is normally used to limit the radius of curvature and thus prevent permanent deformation. The length and configuration of the stinger are such that bending stresses in the supported portion of the pipe are kept below the elastic limit of the pipe material and bending moments generated by the unsupported portion are maintained with predetermined bounds. This dictates the use of a very long stinger having a long radius of curvature. The stinger may be either rigid or articulated and may be equipped with floats or similar buoyant members to aid in supporting the pipe. The use of such equipment has permitted the laying of pipelines in considerably deeper water than might otherwise have been feasible.

One of the difficulties associated with the use of laybarges or similar vessels fitted with long stingers of conventional design is that of controlling lateral stresses due to transverse waves and currents. In many areas, waves and currents tend to move the vessel, stinger and pipe laterally with respect to the pipeline route. This movement creates bending and shear stresses that may result in failure of the pipe and stinger if not controlled. Experience has shown that such movement can be compensated for in part by adjusting the heading of the vessel and by using somewhat shorter articulated stingers which are less subject to transverse waves and currents. Although these measures have alleviated the problem somewhat, difficulties of this type still occur.

SUMMARY OF THE INVENTION

This invention provides an improved system for the laying of marine pipelines which at least in part avoids the difficulties encountered with conventional stingers and permits the laying of pipe in deeper water and under more adverse conditions than do systems used in the past. In accordance with the invention, the pipe being laid is bent as it is discharged from the laybarge or similar vessel by passing it over a retractable curved stinger having a radius of curvature sufficiently small to exceed the elastic limit of the pipe material and is subsequently straightened to remove the residual curvature. This permits discharge of the pipe from the vessel at the desired angle of departure with a much shorter stinger than would otherwise be required and makes possible changes in the angle of departure as necessary by simply extending or retracting the apparatus. The shorter stinger offers considerably less resistance to waves and currents than the rigid or articulated members employed heretofore, undergoes less lateral movement than conventional stingers, and poses fewer problems due to bending and shear stresses than do the conventional devices.

The apparatus of the invention will normally comprise a rigid curved stinger mounted on a track or roller system to permit its extension or retraction with respect to the stern of the laybarge. The curved portion of the apparatus has a radius of curvature sufficiently small to exceed the elastic limit of the pipe passing over the device. The outer end of the stinger may have a greater radius of curvature than the inboard portion or may be straight and extend tangentially to the curved portion. The apparatus is mounted so that the angle of departure of the pipe can be adjusted as desired by extending or retracting the stinger a short distance. Straightening rollers or similar devices near the end of the stinger remove the residual curvature before the pipe is discharged.

The use of the apparatus of the invention not only alleviates difficulties due to transverse waves and currents but also facilitates the application of tension to the suspended pipeline and simplifies securing of the barge and line in the event of a severe storm. The force required to bend the pipe and then straighten it tends to hold the pipe back and thus assists the tensioning device onboard the vessel in maintaining the required tension in the suspended portion of the line. In the event of a storm, the pipe can be lowered to the bottom of the water with a cable for maintaining sufficient tension to prevent overstressing and the equipment used for bending and subsequently straightening the pipe can then be raised from the water onto the stern of the barge. This is feasible because such equipment will normally be much shorter and more compact than the conventional stinger. These and other advantages of the system permit substantial savings during the laying of offshore pipelines in unprotected areas.

DESCRIPTION OF THE PREFERRED EMBODIMENTS

Figure 1:
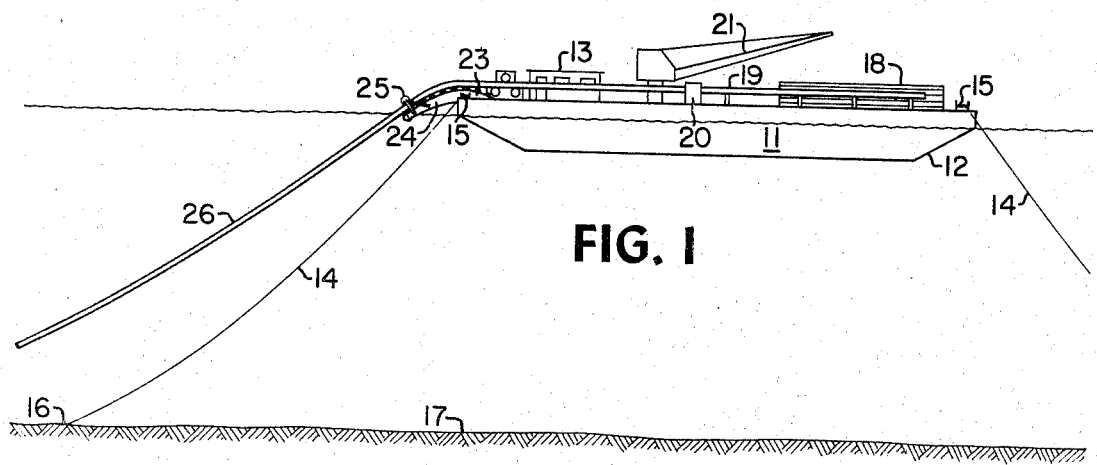
FIG. 1 in the drawing depicts a laybarge provided with a retractable stinger for bending and subsequently straightening pipe as it is discharged from the barge during the laying of an offshore pipeline.

FIG. 1 in the drawing depicts a laybarge 11 positioned at an offshore pipeline construction site during the laying of an underwater pipeline. The barge shown includes an elongated hull 12 containing a hold in which supplies, fuel and equipment may be stored. A superstructure 13 including control equipment and the like is positioned on the deck of the barge near the stern. The barge shown is held in position by mooring lines 14 extending from winches 15 on the deck to anchors 16 embedded in the ocean floor 17. The barge may be propelled along the pipeline route by taking in line at the bow, releasing line at the stern, and shifting the anchors as necessary. In lieu of this, the vessel may be provided with a propulsion system which does not appear in the drawing. Such a system will normally include a propeller at the stern of the vessel for providing forward thrust and two or more laterally directed propellers near the bow and stern for maintaining the desired heading or changing the lateral position of the barge as necessary. These "side thrusters" may be operated selectively to permit precise control of the vessel's position under various wind, wave and current conditions. The barge shown also includes pipe storage racks 18, a pipe ramp 19 on which sections of pipe are aligned and connected together, a pipe tensioning device 20 for engaging the pipe and retarding its movement to the rear of the barge, and a crane 21 and similar pipe handling equipment. All of these latter items of equipment may be of conventional design. The use of a tensioning device is not always essential.

The apparatus for bending and subsequently straightening the pipe on the barge of FIG. 1 comprises a curved stinger which is mounted in a recessed area near the stern of the barge. The forward section 23 of this device has a radius of curvature sufficiently small to exceed the elastic limit of pipe forced over it. The after section 24 is substantially tangent to the curved portion so that the angle of departure of a string of pipe extending into the water from the device is a function of the position of the stinger with respect to the barge. Straightening rollers or similar means 25 are provided near the outboard end to remove residual curvature as the pipe passes through them. The straightening means may be adjustable to accommodate pipe of various sizes and wall thicknesses. Pipe string 26 extends over the curved stinger and through the straightening device into the water behind the barge. The suspended portion of the pipeline between the straightening section and the ocean floor has an approximately catenary configuration.

Figure 2:
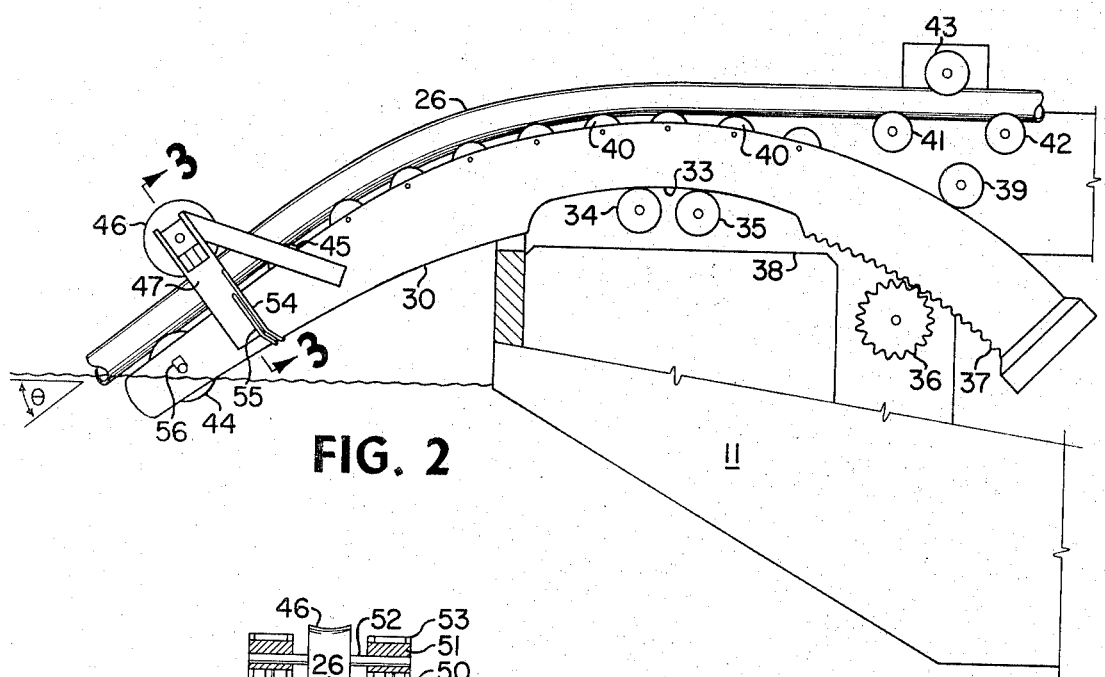
FIG. 2 is an enlarged, fragmentary view of a portion of a barge similar to that of FIG. 1 showing the retractable stinger in greater detail; and, FIG. 3 is a cross section through the apparatus of FIG. 2 taken about the line 3—3.
Figure 3:
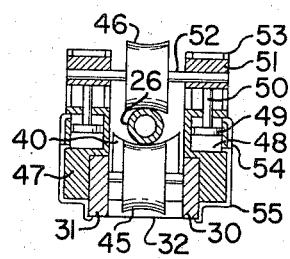

FIGS. 2 and 3 in the drawing illustrate the stinger in greater detail. As indicated earlier, the apparatus is mounted in a recess near the stern of barge 11 and extends outwardly to support pipe 26 as it is lowered into place. The end of the stinger may extend into the water as shown but it will generally be preferred to mount the device so that the end will clear the water, particularly if the vessel is a semisubmersible. The stinger structure includes parallel side members 30 and 31 which are connected to one another by cross members 32. The lower edge of each side member contains an arcuate recess 33 within which are positioned rollers 34 and 35. The rollers support the stinger near its center and permit it to move back and forth within the limits imposed by the recess. Gear 36, connected by a suitable gear train to an electric motor or other power source not shown, engages a rack 37 on side member 30 to move the stinger. The axles of rollers 34 and 35 and gear 36 are mounted in structural members 38 on either side of the stinger. Only one of these members is shown in the drawing. The rack and lower surface of support members 30 extend along an arc so that the stinger clears the edge of the barge regardless of its position.

The upper surface of the stinger extends along an arc over most of its length and includes a tangential straight section near the outer end. Roller 39 is positioned above the stinger in contact with the upper edges of members 30 to prevent lifting of the inboard end and thus holds the stinger in place. Pipe rollers 40 are mounted between the two side members at intervals along the upper surface of the stinger to support pipe 26. The pipe is held in place inboard of the stinger by rollers 41, 42 and 43. These permit controlled bending of the pipe as it contacts the stinger and prevent lifting of the pipe before it reaches the stinger. The radius of curvature of the curved portion of the stinger over which the pipe extends is sufficiently small to exceed the elastic limit of the pipe and thus produce plastic bending. The outer end of the stinger beyond the curved portion contains lower straightening rollers 44 and 45. These will normally be of somewhat larger diameter than the pipe supporting rollers 40. Upper straightening roller 46 is positioned above the pipe and supported on hydraulically actuated supporting members 47. The elastic limit of the pipe is again exceeded as it passes between the straightening rollers. As can be seen more clearly from FIG. 3 of the drawing, each supporting member includes a cylinder 48 containing a piston 49. A piston rod 50 extends through an opening in the upper end of the cylinder to a sliding block 51 containing the bearing and end of the axle 52 on which roller 46 is supported. Each block is held in place by vertical guides 53 on the supporting member. Hydraulic lines 54 and 55 are connected to a hydraulic fluid pump and reservoir to permit the pumping of fluid into and out of the cylinder above and below the piston. By thus raising or lowering the pistons, the angle through which the pipe is bent as it passes through the straightening rollers can be controlled.

A load cell or similar device 56 connected to the axle of lower straightening roller 44 provides a measurement of the pressure on the pipe at a station aboard the barge. The circuitry required, not shown, may be of conventional design and will be familiar to those skilled in the art.

As indicated earlier, the radius of curvature of the stinger should be such that the elastic limit of the pipe will be exceeded as the pipe passes over the curved portion. The maximum radius of curvature will thus depend in part upon the size and type of pipe to be handled and can readily be calculated. The relationships between pipe diameter and wall thickness for most steel pipe are such that a stinger designed to handle large pipe can generally also be used to handle pipe of smaller sizes. Except where very small pipe is to be used, a single stinger with a fixed radius of curvature will therefore generally be adequate. The amount of bending required for straightening, on the other hand, will differ for each different pipe size and hence adjustable or replaceable rolls are provided. Because of the relatively small radius of curvature generally employed, concrete coated pipe shouly normally be avoided.

In using the apparatus of the invention, the pipe to be laid will extend aft to the stinger from suitable pipe handling equipment located on the deck of the barge. It is usually preferred that the stinger be installed in a center slot at the stern of the barge but in some cases installation on the side of the barge is feasible, particularly if the barge width is increased to provide space for welding stations and tensioning equipment. At the onset of a pipelaying operation, the upper straightening roller 46 will normally be removed from the stinger and the length extending over the stinger is sufficient to permit its being forced into conformance with the curvature of the stinger. Once the pipe has been pulled downwardly onto the supporting rollers of the stinger, the upper straightening roller 46 can be connected in place and the pipe can be fed outwardly over the stinger until the end has been secured at or near the offshore site from which the pipeline is to be laid. About 13,000 pounds of force will be required to pull an 18-inch pipe through the straightening rollers and hence the force exerted by the tensioning device aboard the barge can be considerably less than that which would otherwise be required.

After the end of the pipeline has been secured in place on or near the ocean floor, the barge can be moved forward to permit laying of the line along the pipeline route. The barge will normally be winched forward, moving and resetting the anchors as necessary. As the barge advances, the pipeline moves from the pipe ramp over the curved stinger and through the straightening device into the water behind the vessel. Additional sections of pipe are welded in place as needed. This procedure is continued until the pipeline destination is reached. Transverse waves and currents that often present severe problems during conventional pipelaying operations have relatively little, if any, effect on the apparatus and pipeline extending from the stern of the barge. The large area which a conventional stinger exposes to waves and currents is virtually eliminated.

The departure angle will normally be monitored as the pipe is laid. This is the vertical angle between the surface of the water and the center line of the pipe as it enters the water behind the laybarge and will normally range from about 15° in very shallow water to 60° or more in very deep water. In general, departure angles of from about 20° to about 45° will be satisfactory for operations carried out in water of moderate depth.

Ideally, the pipe should leave the stinger at an angle which is tangent to the modified catenary curve that the pipeline will naturally assume under the existing conditions of negative buoyancy, water depth, applied tension and the like. The pressure exerted on the pipe by the outermost straightening roller 44 can be monitored continually by means of the load cell or similar device 56 on the roller axle and used to control the position of the stinger and the departure angle. For any given pipe size, and acceptable range of pressure values can be calculated. A value which is excessively high indicates that the departure angle should be greater and that the stinger should therefore be moved outwardly from the barge so that the pipe projects downwardly at a steeper angle. This can be done by rotating gear 36 so that the entire stinger moves to the rear. If the pressure reading is too low, on the other hand, the departure angle should be decreased by retracting the stinger until an acceptable pressure reading is obtained. Some bending moment as the line leaves the stinger can be tolerated because of the beam strength of the pipe. This permits some latitude with respect to the position of the stinger and helps compensate for a reasonable amount of dynamic stress imparted to the pipeline by barge motion.

In the event that severe weather necessitates an interruption of operations, the pipeline can be lowered to the bottom of the water by means of one or more cables while maintaining sufficient tension to avoid overstressing and excessive bending moments. A buoy can be used to mark the end of the line and permit the resumption of operations after the storm has subsided. Once this has been done, the barge can be moved from the pipeline route to a sheltered location. The stinger can be fully retracted to minimize exposure to wind and waves if desired. After the storm is over, the line attached to the end of the pipe can be located by means of the buoy or by grappling and the line can be picked up with sufficient tension to prevent damage to the pipe. Following this, the end of the pipe can be pulled back onto the stinger to permit the welding of an additional pipe section in place. Pipelaying operations as described earlier can then be resumed.

It will be apparent that the stinger shown in the drawing can be modified in various ways. In lieu of the gear arrangement shown for positioning the stinger, for example, hydraulic cylinders or a system of cables and pulleys may be used. Various float arrangements can be employed to assist in supporting the stinger when it is in the outermost extended position. The straightening rollers can employ jack screws in lieu of hydraulics. Similarly, the apparatus is not restricted to operations in which the pipeline is laid from a moving barge and instead may also be employed by mooring the barge in a fixed location and then pulling the pipe over the stinger by means of a cable attached to a winch on a tug or other vessel, on a platform, or onshore. This latter mode of operation is particularly useful for the laying of pipelines which extend onto the shore and for laying lines near platforms where movement of the laybarge in close proximity to the platforms might be hazardous. These and other modifications will be apparent to those skilled in the art.

We claim:

1. Apparatus for laying an underwater pipeline from the stern of a floating vessel which comprises a curved retractable stinger mounted on said vessel and extending over the stern thereof, said stinger having a radius of curvature sufficiently small to exceed the elastic limit of pipe passing over said stinger in contact therewith; means on said vessel near the stern thereof for moving said stinger between a retracted position in which the outer end of the stinger extends at a first angle to the surface of the water astern of said vessel and an extended position in which the outer end of said stinger extends at a second angle to the surface of the water astern of said vessel greater than said first angle; and means on said stinger near the outer end thereof for removing residual curvature from pipe passing over said stinger in contact therewith.

2. Apparatus as defined by claim 1 wherein said means for removing residual curvature includes at least one straightening roller beneath which said pipe passes.

3. Apparatus as defined by claim 2 including means for adjusting the position of said straightening roller to accommodate pipe of various sizes.

4. Apparatus as defined by claim 3 wherein said means for adjusting the position of said roller is hydraulically actuated.

5. Apparatus as defined by claim 1 including means for sensing the pressure exerted on said pipe by said straightening means.

6. Apparatus as defined by claim 5 wherein said sensing means includes a load cell connected to said straightening means.

7. Apparatus as defined by claim 1 wherein said means for moving said stinger between said retracted and said extended positions includes a rack on said stinger and a gear train for driving said rack.

8. Apparatus as defined by claim 1 wherein the radius of curvature of said stinger is nonuniform and increases near the outer end thereof.

9. Apparatus as defined by claim 1 including a plurality of supporting rollers spaced at intervals along the upper surface of said stinger.

10. Apparatus as defined by claim 1 wherein the outer end of said stinger is substantially straight and extends tangential to the curved portion of the stinger.

11. A method for laying a marine pipeline from a floating vessel which comprises passing said pipeline from said vessel into the water behind the vessel over a curved, retractable stinger having a radius of curvature sufficiently small to exceed the elastic limit of the pipe, removing residual curvature from said pipe near the outer end of said stinger, and adjusting the position of said stinger with respect to said vessel to maintain the desired angle of departure as the pipelaying operation progresses.

12. A method as defined by claim 11 wherein said floating vessel is moored in a fixed position and said pipeline is moved from the vessel over said stinger and into the water by pulling on the end of said pipeline.

13. A method as defined by claim 11 wherein said pipeline is moved from said vessel over said stinger and into the water by moving said vessel forward along the pipeline route.

14. A method as defined by claim 11 wherein the pressure exerted on the pipe as the residual curvature is removed is monitored during the pipe-laying operation.

15. A method as defined by claim 14 wherein the position of said stinger is adjusted in response to said monitoring of the pressure exerted on said pipe.

* * * * *